INVENTOR.
Armin Rappold

BY Percy P. Lantzy
Attorney

INVENTOR.
Armin Rappold

BY [signature]
Attorney

United States Patent Office 3,187,095

Patented June 1, 1965

3,187,095
CONTRAST CONTROL ARRANGEMENT FOR TELEVISION RECEIVERS PROVIDING NON-LINEAR GRAY SCALE

Armin Rappold, Neuenburg, Wurttemberg, Germany, assignor to International Standard Electric Corporation, New York, N.Y., a corporation of Delaware Filed Oct. 20, 1961, Ser. No. 146,459
Claims priority, application Germany, Oct. 25, 1960, 17,042
16 Claims. (Cl. 178—7.3)

Figures 1A, 1B, 1C:
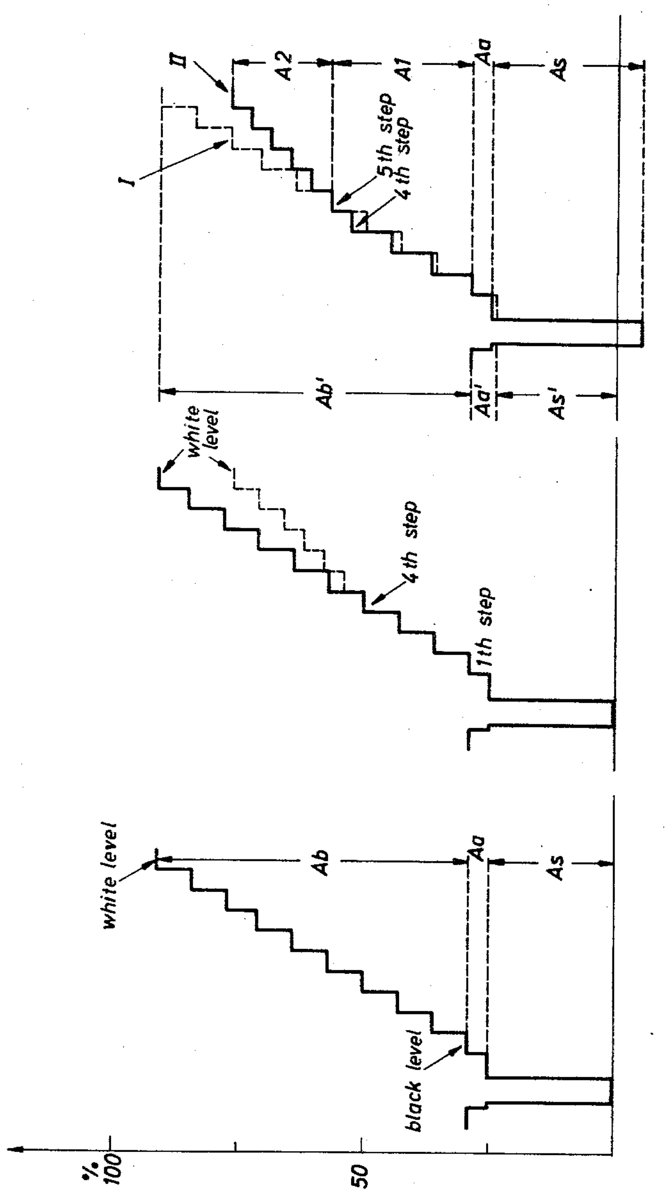

This invention relates to contrast control arrangements and more particularly to a continuous contrast control arrangement for television receivers.

Contrast control arrangements, such as described in the copending applications of A. Rappold, Serial No. 19,071, filed March 31, 1960, and F. Wolff, Serial No. 59,622, filed September 30, 1960, assigned to the same assignee as the present application, provide an automatic reduction of the contrast in television pictures including many or large white picture portions and an increase of the contrast in those television pictures whose contents are lying chiefly within the black and gray half tones. These contrast control arrangements are able to correct the uncertainty of the black level reproduction connected with the variation of the black level admissible according to the transmission standards. Further, these systems are able to reduce or substantially eliminate the disagreeable flickering effect in the case where the contrast is correctly adjusted but the picture components have a large area of white details. Also these prior contrast control arrangements are able to reduce or prevent a slight misadjustment of the background brightness which would cause a substantial loss of information in those situations where there was low contrast and chiefly dark images, or in the cases of an insufficient modulation of the transmitter, as film transmission.

However, these contrast control arrangements still have the disadvantage that the lower half tones, which in many cases were already transmitted with poor quality, are additionally regulated or controlled to have decreased contrast.

Therefore, it is an object of this invention to provide a contrast control circuit arrangement overcoming the above-mentioned disadvantages.

Another object of the present invention is the provision of a circuit arrangement wherein the contrast control has a characteristic including two portions each of which have different slopes thereby enabling the reproduction of the lower shading values with the greatest certainty.

A feature of this invention is the provision of a contrast control arrangement comprising a first means having a linear contrast control charasteristic between the black and white levels of a television signal, a second means capable of being selectively coupled to the first means to provide a modified contrast control characteristic including a first portion extending from a first point disposed in juxtaposition to the one quarter point of the entire range between the black level and the white level to a second point disposed in juxtaposition to the one half point of this entire range having a slope steeper than the slope of the linear characteristic and a second portion extending for the remainder of the modified characteristic having a slope less than the slope of the linear characteristic whereby the value of the white level of the modified characteristic is lower than the value of the white level of the linear characteristic.

Another feature of this invention is the provision of an arrangement to selectively couple the modifying circuit arrangement to the linear contrast control circuit arrangement either manually or automatically with the automatic coupling arrangement responding to either the white content or the amplitude of the horizontal and/or vertical deflection frequencies contained in the picture components of a television signal.

Figure 1D:
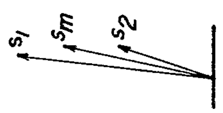
Figure 2:
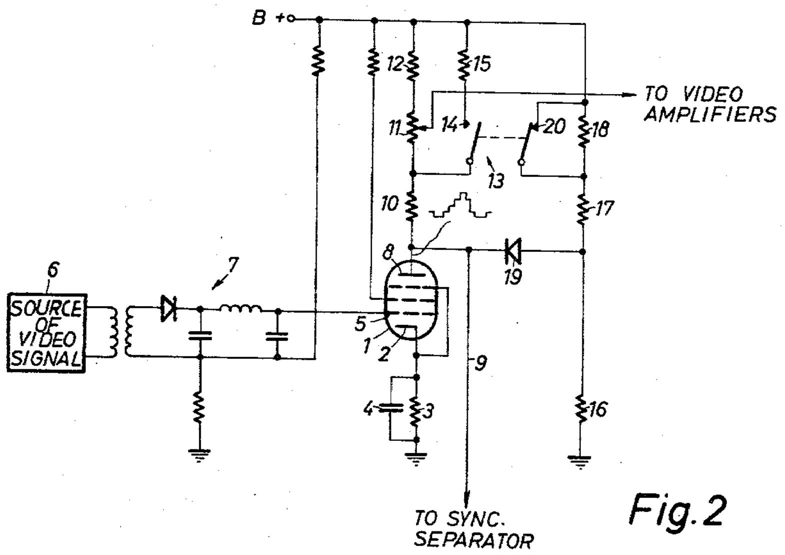
Figure 3:
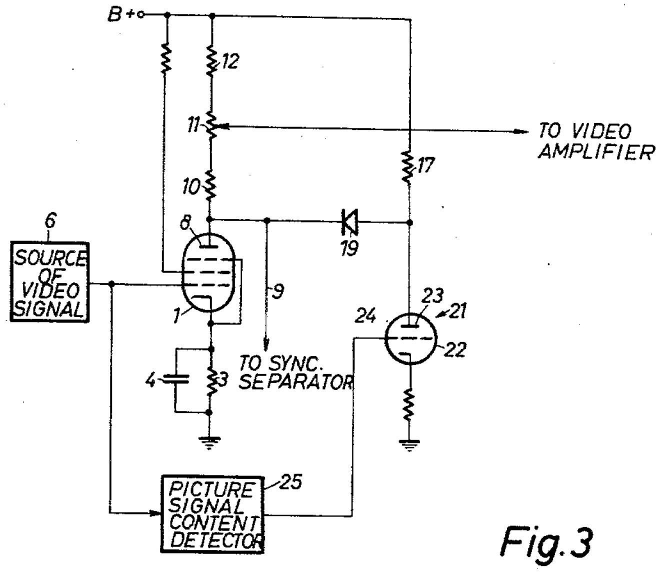

The above-mentioned and other features and objects of this invention will become more apparent by reference to the following description taken in conjunction with the accompanying drawings in which:

FIG. 1*a* is an illustration of a gray scale curve showing the contrast control characteristic achieved by the prior art arrangements;

FIG. 1*b* is an illustration of a gray scale curve showing an improved contrast control characteristic in accordance with the principles of this invention;

FIG. 1*c* is an illustration of a plurality of gray scale curves useful in explaining the operation of the embodiments of this invention shown in FIGS. 2 and 3;

FIG. 1*d* is an illustration of the slope of curve I and portions of curve II of FIG. 1*c*;

FIG. 2 is a schematic diagram of an embodiment of the contrast control arrangement of the present invention; and FIG. 3 is a schematic diagram of another embodiment of the contrast control arrangement of this invention illustrating the automatic control of the contrast characteristics.

Referring to FIG. 1*a*, there is illustrated therein a gray scale divided into 10 shading values. The above-described prior art type of contrast control arrangements control the entire interval $A_s+A_a+A_b$ and also the background brightness is controlled in such a way that the black level is only slightly raised in the case of dark pictures which should be highly amplified, in other words, the black level remain almost constant. Thus, the prior art arrangements have the disadvantage that all half tones including the lower ones which, as already mentioned hereinabove, are often transmitted in a poor quality, are temporarily regulated down as well.

This arrangement can be improved by arranging the contrast control arrangement to operate for control purposes from a given step of the gray scale upward, for instance, from the fourth shading value upward substantially as illustrated in FIG. 1*b*. This type of control can be obtained by an arrangement which responds automatically to the white content of the picture components of a television signal to adjust the gain of the contrast control arrangement to reduce the slope thereof, such as indicated by the dotted line curve in FIG. 1*b*. The purpose of this type of control is to reproduce the lower shading values in general in all scenes with the greatest certainty, because just these values are spoiled in the most noticeable way on the way from the studio to the reproducing picture tube and by slight background brightness variations.

The observation of several types of scenes has shown that if the characteristic of the contrast control is arranged to have different end points than the characteristic of the usual contrast control arrangement and two portions, each with different slopes, there is obtained the most advantageous contrast control arrangement. The type of contrast control characteristic is illustrated in FIG. 1*c*, wherein curve I, shown in dash lines, illustrates the normal linear contrast control characteristic achieved by conventional contrast control arrangements, such as those described with respect to the cited copending applications. It will be observed that curve I has the usual linear characteristic with the partial intervals $A_s'$, $A_a'$, $A_b'$ and a constant median slope $s_m$, substantially as illustrated in FIG. 1*d*.

Comparing curve II with curve I, it is observed that the curve II has the intervals $A_s$, $A_a$, $A_1$, $A_2$ and has an increased slope $s_1$, FIG. 1*d*, up to the fourth step and a reduced slope $s_2$, FIG. 1*d*, from there on to the value of the white level of the modified contrast control characteristic. Thus, with a contrast control arrangement having this type of contrast control characteristic, dark and low contrast pictures are reproduced with the greatest slopes $s_1$ and pictures with a strong contrast are only weakened in the upper six steps of brightness. The thus effective influencing of a contrast, that is, the emphasis of the lower shading values has an advantageous effect on the whole. When changing over from curve I to curve II, the subjective brightness impression is increased somewhat in most of the pictures although the beam current remains constant. Especially when viewing the picture in bright rooms, it can be readily observed that the dark tones are more accentuated without causing at the same time a flickering of the white picture portions.

Referring to FIG. 2, there is illustrated therein a schematic diagram of an embodiment following the principles of this invention to provide a contrast control arrangement having a contrast characteristic of two portions each of which has a different slope than the normal linear slope characteristic of the prior art arrangements. The contrast control arrangement includes an electron discharge device or tube 1 having cathode 2 coupled to ground through the usual cathode resistor 3 and bypass condenser 4. The control grid 5 of discharge device 1 is coupled to a source of video signal 6 by means of the coupling circuit 7. The video signal of source 6 is a composite signal having the usual picture components, line synchronizing pulses and field synchronizing pulses and the unidirectional component. The suppressor and screen grids of the pentode type tube 1 are connected in the usual manner to provide a substantially constant current amplifying device. The anode 8 of tube 1 has coupled thereto a conductor 9 connecting anode 8 to the synchronizing separator circuit and, hence, the deflection systems (not shown). Anode 8 also has coupled thereto an anode load including resistor 10, contrast control 11, resistor 12 and a B+ anode voltage supply.

With respect to the synchronizing signal channel, the amplifier stage including tube 1 serve as a preamplifier for the synchronizing signals and the unidirectional component and provides for these synchronizing signal components substantially constant amplification which is substantially unaffected by the contrast control arrangement to be described hereinafter.

In the embodiment illustrated in FIG. 2, switch 13 when connected to contact 14 places resistor 15 in shunt relation to a portion of the anode load circuit, namely, contrast control 11 and resistor 12. With this resistor 15 connected as described, the characteristic of the amplifier stage, as far as contrast control is concerned, is linear substantially as illustrated in curve I, FIG. 1*c*.

In shunt relation to the amplifier stage is connected a voltage divider including resistors 16, 17, and 18 disposed between the B+ anode voltage supply and a reference potential, illustrated as ground. A diode 19 has its cathode connected to the junction point between resistors 16 and 17 and its anode to anode 8 of tube 1.

By moving switch 13 to contact 20, there is now provided a short circuit around resistor 18 which will then establish a predetermined positive potential on the cathode of diode 19 to block diode 19 up to a predetermined gray scale level or step. By properly adjusting the operating characteristics of the amplifier circuit including tube 1 and the value of the voltage divider including resistors 16 and 17, it is possible to then have diode 19 remain in its nonconducting condition up to the time the amplitude of the signal coupled to grid 5 of tube 1 reaches the fourth step of the curve II. Under this arrangement, the characteristic of the amplifier stage including tube 1 will follow the solid line of curve II up to the fourth step with a slope $s_1$ as described hereinabove. When the signal at anode 8 of tube 1 reaches the amplitude equal to or exceeding the fourth step, diode 19 will begin conducting or become unblocked. When this occurs, diode 19 and resistor 17 will be disposed in shunt relation with the anode load. With this parallel connection of the aforementioned components, the slope of the characteristic of the contrast control stage will be reduced from slope $s_1$ to slope $s_2$. With the diode 19 conducting, the resistive value of diode 19 and resistor 17 will change as the conduction in diode 19 increases to alter the resistive characteristic of the now parallel anode load to bring about the reduced slope of curve II.

The video signal after having experienced the contrast control provided by the above-described contrast control stage is coupled from contrast control 11 to further amplifier stages (not shown).

In the illustration of FIG. 2, it has been illustrated that the characteristic of the contrast control stage has been changed from a linear contrast control characteristic, curve I, to a contrast control characteristic having two portions, the lower portion having a slope steeper than the slope $s_m$ of curve I and the upper portion having a slope less than the slope of curve I by means of a manual switch 13. The selection of the contrast control characteristic can be made automatic if resistor 16 is replaced by a voltage controlled variable resistor whose resistance value is under control of a control voltage derived from given components of the picture components. Such an arrangement is illustrated in FIG. 3, wherein like components are identified by the same reference character as employed in connection with FIG. 2.

Referring to FIG. 3, an automatic control of the biasing of diode 19 for the selection of the contrast control characteristic is provided by tube system 21 illustrated to be a triode 22 having its anode 23 coupled to the cathode of diode 19 and its grid 24 coupled to picture signal content detector 25. Detector 25 is coupled to source 6 to provide an output control voltage proportional to the white content or the amplitude of the basic synchronizing frequencies (horizontal and/or vertical) contained in the picture components of the television signal to control the conduction of tube 22 and, hence, the bias potential of diode 19. Detector 25 may take the form of the detector described in either of the above-identified copending applications to obtain the desired control voltage. The operating characteristics of tube 22 and the remainder of the voltage divider and the amplifier stage including tube 1 are adjusted so that diode 19 remains blocked until the picture components have achieved an amplitude equal to the fourth step of the gray scale as illustrated in curve II, FIG. 1*c*. With diode 19 blocked by this arrangement, the contrast control characteristic will have a slope substantially equal to a slope $s_1$. Upon achieving the amplitude of the fourth step of curve II, diode 19 will be rendered conductive and, thus, will alter the anode load of tube 1 by placing diode 19 and resistor 17 in shunt relation to resistor 10, contrast control 11, and resistor 12. The operation of the circuit of FIG. 3 then will be identical with the operation of FIG. 2.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a television receiver, a contrast control arrangement comprising a first means having a linear contrast control characteristic between the black and white levels of a television signal, and a second means selectively coupled to said first means to modify said contrast control characteristic to include a first portion extending from a first point disposed in juxtaposition to the one quarter point of the entire range between said black level and said white level to a second point disposed in juxtaposition to the one half point of said entire range having a slope steeper than the slope of said linear characteristic and a second portion extending for the remainder of said modified characteristic having a slope less than the slope of said linear characteristic whereby the value of the white level of said modified characteristic is lower than the value of the white level of said linear characteristic.

2. An arrangement according to claim 1, wherein said second means is selectively coupled to said first means by a switching device.

3. An arrangement according to claim 1, wherein the coupling of said second means to said first means is controlled by the white content of the picture components of the television signal.

4. An arrangement according to claim 1, wherein the coupling of said second means to said first means is controlled by the amplitude of the basic frequencies of the horizontal and vertical deflecting frequencies contained in the picture components of the television signal.

5. An arrangement according to claim 1, wherein said second means is selectively coupled to said first means by a controlled tube system.

6. An arrangement according to claim 5, wherein said controlled tube system responds to the white content of the picture components of the television signal.

7. An arrangement according to claim 5, wherein said controlled tube system responds to the amplitude of the basic frequencies of the horizontal and vertical deflecting frequencies contained in the picture components of the television signal.

8. An arrangement according to claim 1, wherein said first means includes an amplifier stage having a given anode load and said second means includes a voltage divider disposed in shunt relation to said amplifier stage and a diode coupled between the anode of said amplifier stage and a given point on said voltage divider to render said diode nonconductor until said second point is equalled or exceeded by the picture components of the television signal.

9. An arrangement according to claim 8, wherein said voltage divider includes a resistor coupled between the anode supply voltage of said amplifier stage and said diode and a tube system responsive to the content of given components in the picture components of the television signal coupled between said diode and a reference potential to adjust the unblocking potential of said diode in accordance with amplitude of said given components.

10. In a television receiver, a contrast control arrangement comprising a first means having a linear contrast control characteristic between the black and the white levels of a television signal, a second means capable of modifying said contrast control characteristic, and means to selectively couple said second means to said first means to modify said contrast control characteristic to include a first portion extending from a point disposed in juxtaposition to the one quarter point of the entire range between said black level and said white level to a second point disposed in juxtaposition to the one half point of said entire range having a slope steeper than the slope of said linear characteristic and a second portion extending for the remainder of said modified characteristic having a slope less than the slope of said linear characteristic whereby the value of the white level of said modified characteristic is lower than the value of the white level of said linear characteristic.

11. An arrangement according to claim 10, wherein said selective means includes a switching device.

12. An arrangement according to claim 10, wherein said selective means is controlled by the white content of the picture components of the television signal.

13. An arrangement according to claim 10, wherein said selective means is controlled by the amplitude of the basic frequencies of the horizontal and vertical deflecting frequencies contained in the picture components of the television signal.

14. An arrangement according to claim 10, wherein said selective means includes a controlled tube system.

15. An arrangement according to claim 14, wherein said controlled tube system responds to the white content of the picture components of the television signal.

16. An arrangement according to claim 14, wherein said controlled tube system responds to the amplitude of the basic frequencies of the horizontal and vertical deflecting frequencies contained in the picture components of the television signal.

References Cited by the Examiner

UNITED STATES PATENTS

| | | | |
|---|---|---|---|
| 2,509,987 | 5/50 | Newman | 178—7.3 |
| 2,999,127 | 9/61 | Fisher | 178—7.5 |

FOREIGN PATENTS

| | | |
|---|---|---|
| 203,073 | 4/59 | Austria. |

OTHER REFERENCES

Germany Patent 1,088,534, Sept. 8, 1960 (3 pp. spec., 2 shts. dwg.).

Suhrmann: Germany, 1,100,683, Mar. 2, 1961 (2 pp. spec., 1 sht. dwg.).

DAVID G. REDINBAUGH, *Primary Examiner.*

JOHN P. WILDMAN, *Examiner.*